UNITED STATES PATENT OFFICE.

BYRON F. McINTYRE, OF EAST ORANGE, NEW JERSEY, ASSIGNOR TO CHARLES M. COEN, OF WASHINGTON, DISTRICT OF COLUMBIA.

FIREPROOFING COMPOUND.

SPECIFICATION forming part of Letters Patent No. 391,261, dated October 16, 1888.

Application filed August 25, 1888. Serial No. 283,775. (No specimens.)

*To all whom it may concern:*

Be it known that I, BYRON F. MCINTYRE, a citizen of the United States, residing at East Orange, in the county of Essex and State of New Jersey, have invented certain new and useful Improvements in Fireproofing Compounds; and I do hereby declare the following to be a full, clear, and exact description of the invention, such as will enable others skilled in the art to which it appertains to make and use the same.

My invention relates to an improved fireproofing compound; and it consists in the combination of certain ingredients, hereinafter specified, and definitely pointed out in the claims.

In the compounds for fireproofing purposes heretofore employed the essential ingredients are such as leave a deposit or easily-detachable scale on the surface of the article treated, which renders them unsuitable for use on the delicate fabrics or finer materials. It is also found that by the use of these compounds the articles treated are in a measure disfigured and their natural appearance and flexibility altered by the surface deposit. They are further objectionable inasmuch as the rubbing or bending of the article treated loosens the fireproofing deposit on the surface, thereby rendering another treatment necessary.

The object of my invention is to provide a fireproofing compound of a nature to overcome the above defects, and which will be applicable to all porous articles, either of a fine or coarse fiber. I attain this object by combining ingredients which will, when applied, penetrate and be absorbed into the fiber, imparting its fireproofing properties to the entire article treated without impairing its utility or in any way changing its natural appearance or flexibility.

The essential feature of my invention is in the use of a penetrating and binding agent having properties which will conduct and retain certain salts or fireproofing ingredients into the fiber of articles or material; and it consists in the combination of sulphoricinoleate of ammonia or its equivalent, however produced, and borax or borate of sodium, chloride of ammonia, alum, tungstate of soda and silicate of soda. The proportion of each ingredient is adjusted to equal parts.

This compound is dissolved in water and the article to be treated is immersed or saturated with the liquid.

It is not essential to employ all of the above-named ingredients, as in practice I have found that the use of borax and chloride of ammonia combined with sulphoricinoleate in equal parts is all that is essential in producing the result above stated.

The above compound may be used in treating cotton, wool, laces, tarletans, and other delicate and soft goods, also with colored goods having fast colors, without in the least injuring the pliability or color of the material. It may also be incorporated in paints, imparting to them a fire-proof nature.

Having thus described my invention, what I claim as new, and desire to secure by Letters Patent, is—

1. A composition of matter for fireproofing purposes, consisting of sulphoricinoleate of ammonia, borax, and chloride of ammonia.

2. A composition of matter for fireproofing purposes, consisting of sulphoricinoleate of ammonia, borax, chloride of ammonia, alum, tungstate of soda, and silicate of soda.

In testimony whereof I affix my signature in presence of two witnesses.

BYRON F. McINTYRE.

Witnesses:
NELLIE L. COLE,
GEORGE A. STORMS.